US011866022B2

(12) United States Patent
Cheon et al.

(10) Patent No.: US 11,866,022 B2
(45) Date of Patent: Jan. 9, 2024

(54) ELECTRONIC HYDRAULIC BRAKE DEVICE

(71) Applicant: HYUNDAI MOBIS Co., Ltd., Seoul (KR)

(72) Inventors: Se Young Cheon, Yongin-si (KR); Jae Woong Hur, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 575 days.

(21) Appl. No.: 16/739,079

(22) Filed: Jan. 9, 2020

(65) Prior Publication Data
US 2020/0331444 A1 Oct. 22, 2020

(30) Foreign Application Priority Data

Apr. 18, 2019 (KR) ........................ 10-2019-0045335

(51) Int. Cl.
B60T 13/14 (2006.01)
B60T 8/32 (2006.01)
B60T 8/88 (2006.01)
B60T 8/34 (2006.01)
B60T 13/58 (2006.01)

(52) U.S. Cl.
CPC ............ *B60T 8/3275* (2013.01); *B60T 8/344* (2013.01); *B60T 8/885* (2013.01); *B60T 13/58* (2013.01)

(58) Field of Classification Search
CPC ........ B60T 8/3275; B60T 8/4013; B60T 8/17; B60T 8/326; B60T 8/404; B60T 8/4266; B60T 2270/413; B60T 2270/402; B60T 7/042; B60T 13/686; B60T 13/745; B60T 13/662; B60T 13/74; B60T 8/344; B60T 8/885; B60T 13/58
See application file for complete search history.

(56) References Cited

U.S. PATENT DOCUMENTS 4,900,105 A * 2/1990 Burgdorf .................. B60T 8/44
303/116.1
6,412,882 B1 * 7/2002 Isono ...................... B60T 8/367
903/952
6,945,610 B1 9/2005 Mizutani et al.
(Continued)

FOREIGN PATENT DOCUMENTS

CN 102774372 11/2012
JP H06-087426 3/1994
(Continued)

OTHER PUBLICATIONS

Non-Final Office Action dated Apr. 20, 2023, issued to U.S. Appl. No. 17/516,629.
(Continued)

*Primary Examiner* — Nicholas J Lane
*Assistant Examiner* — Stephen M Bowes
(74) *Attorney, Agent, or Firm* — H.C. Park & Associates, PLC

(57) ABSTRACT

An electronic hydraulic brake device includes a main braking part and an assist braking part. The main braking part is configured to drive a motor to provide hydraulic pressure to a plurality of wheel cylinders. The assist braking part is connected to the main braking part. The assist braking part is configured to provide auxiliary hydraulic pressure to the plurality of wheel cylinders in response to an operation error of the main braking part.

6 Claims, 13 Drawing Sheets

(56) References Cited

U.S. PATENT DOCUMENTS

| | | | |
|---|---|---|---|
| 9,327,696 B2 | 5/2016 | Murayama | |
| 2008/0229741 A1* | 9/2008 | Isono | B60T 13/145 |
| | | | 701/76 |
| 2014/0203626 A1 | 7/2014 | Biller et al. | |
| 2017/0001614 A1* | 1/2017 | Yogo | B60T 8/4872 |
| 2020/0172067 A1* | 6/2020 | Einig | B60T 13/146 |

FOREIGN PATENT DOCUMENTS

| | | |
|---|---|---|
| JP | H06107147 | 4/1994 |
| KR | 1019990083250 | 11/1999 |
| KR | 10-2007-0104982 | 10/2007 |
| KR | 1020120126623 | 11/2012 |
| KR | 20160028043 | 3/2016 |
| KR | 1020160028043 | 3/2016 |

OTHER PUBLICATIONS

Final Office Action dated Aug. 29, 2023, issued to U.S. Appl. No. 17/516,629.

\* cited by examiner

ELECTRONIC HYDRAULIC BRAKE DEVICE

CROSS-REFERENCE TO RELATED APPLICATION

This application claims priority to and the benefit of Korean Patent Application No. 10-2019-0045335, filed Apr. 18, 2019, which is hereby incorporated by reference for all purposes as if fully set forth herein.

BACKGROUND

FIELD

Exemplary embodiments generally relate to electronic hydraulic brake devices, and, more particularly, to electronic hydraulic brake devices, which can rapidly perform assist braking when a main braking error occurs in an integrated or separated-type braking system.

DISCUSSION

In general, an electronic hydraulic brake device serves to adjust braking pressure of each wheel using hydraulic pressure of a master cylinder, which is driven by a motor after a driver's pedal pressure is sensed through a sensor. The electronic hydraulic brake device typically includes a sensor for sensing a stroke of the pedal such that a driver can recognize desired braking pressure. The electronic hydraulic brake device may also include a pedal travel simulator, which enables the driver to feel the same pedal pressure as in a conventional hydraulic brake device. Therefore, when the driver steps on the brake pedal, an electronic control unit senses the stepping operation and supplies hydraulic pressure to the master cylinder. The master cylinder transfers braking hydraulic pressure to a wheel cylinder of each wheel to provide a braking force to the wheel. A conventional electronic hydraulic brake device may not rapidly provide braking hydraulic pressure to the wheel cylinder when the motor is damaged, and thus, can cause an accident. Therefore, there is a need for a device capable of solving this issue.

A conventional electro-hydraulic brake system is disclosed in Korean Patent Application No. 10-2007-0104982, laid-open on Oct. 30, 2007, and entitled "Control Apparatus for Valve in Electro-Hydraulic Brake System."

The above information disclosed in this section is only for understanding the background of the inventive concepts, and, therefore, may contain information that does not form prior art.

SUMMARY

Some aspects provide an electronic hydraulic brake device capable of performing (e.g., rapidly performing) assist braking in response to a main braking error in an integrated or separated-type braking system.

Additional aspects will be set forth in the detailed description which follows, and, in part, will be apparent from the disclosure, or may be learned by practice of the inventive concepts.

According to some aspects, an electronic hydraulic brake device includes a main braking part and an assist braking part. The main braking part is configured to drive a motor to provide hydraulic pressure to a plurality of wheel cylinders. The assist braking part is connected to the main braking part. The assist braking part is configured to provide auxiliary hydraulic pressure to the plurality of wheel cylinders in response to an operation error of the main braking part.

In some exemplary embodiments, the main braking part may include a pedal cylinder, a master cylinder, a first hydraulic part, a second hydraulic part, and a hydraulic connector. The pedal cylinder may be configured to generate hydraulic pressure in response to pressurization of a pedal. The master cylinder may be configured to sense operation of the pedal and generate hydraulic pressure in association with the motor. The first hydraulic part may be connected to the master cylinder. The first hydraulic part may be configured to guide hydraulic pressure to a first some of the plurality of wheel cylinders. The second hydraulic part may be connected to the master cylinder. The second hydraulic part may be configured to guide hydraulic pressure to a second some of the plurality of wheel cylinders. The hydraulic connector may be configured to selectively connect the first and second hydraulic parts.

In an exemplary embodiment, the assist braking part may include an assist hydraulic part, an assist accumulator, an assist bypass part, and an assist sensing part. The assist hydraulic part may be connected to one of the first and second hydraulic parts. The assist hydraulic part may be configured to guide hydraulic pressure. The assist accumulator may be connected to the assist hydraulic part and may be filled with the auxiliary hydraulic pressure. The assist bypass part may be configured to bypass the assist hydraulic part to selectively guide hydraulic pressure to the assist accumulator. The assist sensing part may be configured to determine the auxiliary hydraulic pressure of the assist accumulator.

In an exemplary embodiment, the assist accumulator may be configured to selectively receive the hydraulic pressure generated by the master cylinder so as to accumulate the auxiliary braking hydraulic pressure.

In an exemplary embodiment, the assist hydraulic part may include an assist hydraulic line and an assist hydraulic valve. The assist hydraulic line may include a first end connected to one of the first and second hydraulic parts and a second end connected to the assist accumulator. The assist hydraulic valve may be configured to open the assist hydraulic line in response to an operation error of the main braking part.

In an exemplary embodiment, the assist bypass part may include an assist bypass line and an assist bypass valve. The assist bypass line may include ends connected to the assist hydraulic line. The assist bypass line may be configured to cause, at least part, hydraulic pressure to bypass the assist hydraulic valve and to move to the assist accumulator. The assist bypass valve may be configured to cause, at least in part, one direction of flow of the auxiliary hydraulic pressure in the assist bypass line.

In an exemplary embodiment, the electronic hydraulic brake device may further include a storage part connected to the pedal cylinder and configured to store hydraulic pressure. To this end, the assist braking part may further include an assist pump connected to the storage part. The assist pump may be configured to transfer the hydraulic pressure stored in the storage part to the assist accumulator.

In an exemplary embodiment, the assist braking part may include a first assist hydraulic part, a second assist hydraulic part, an assist accumulator, a first assist bypass part, a second assist bypass part, and an assist sensing part. The first assist hydraulic part may be connected to the first hydraulic part. The first assist hydraulic part may be configured to guide hydraulic pressure. The second assist hydraulic part may be connected to the second hydraulic part. The second assist hydraulic part may be configured to guide hydraulic pressure. The assist accumulator may be connected to the first and second assist hydraulic parts and may be filled with the auxiliary hydraulic pressure. The first assist bypass part may be configured to bypass the first assist hydraulic part to guide hydraulic pressure to the assist accumulator. The second assist bypass part may be configured to bypass the second assist hydraulic part to guide hydraulic pressure to the assist accumulator. The assist sensing part may be configured to determine the auxiliary hydraulic pressure of the assist accumulator.

In an exemplary embodiment, the main braking part may include a master cylinder, a first hydraulic part, a second hydraulic part, and a main motor pump. The master cylinder may be configured to generate hydraulic pressure in association with the motor. The first hydraulic part may be connected to the master cylinder. The first hydraulic part may be configured to guide hydraulic pressure to a first some of the plurality of wheel cylinders. The second hydraulic part may be connected to the master cylinder. The second hydraulic part may be configured to guide hydraulic pressure to a second some of the plurality of wheel cylinders. The main motor pump may be connected to the first and second hydraulic parts. The main motor pump may be configured to amplify hydraulic pressure.

In an exemplary embodiment, the assist braking part may include an assist hydraulic part, an assist accumulator, an assist bypass part, and an assist sensing part. The assist hydraulic part may be connected to the first and second hydraulic parts. The assist hydraulic part may be configured to guide hydraulic pressure. The assist accumulator may be connected to the assist hydraulic part and may be filled with the auxiliary hydraulic pressure. The assist bypass part may be configured to bypass the assist hydraulic part to guide hydraulic pressure to the assist accumulator. The assist sensing part may be configured to determine the auxiliary hydraulic pressure of the assist accumulator.

In an exemplary embodiment, the assist accumulator may be configured to receive the hydraulic pressure generated by the master cylinder so as to accumulate the auxiliary braking hydraulic pressure.

In an exemplary embodiment, the assist hydraulic part may include an assist hydraulic line and an assist hydraulic valve. The assist hydraulic line may include a first end connected to the first and second hydraulic parts and a second end connected to the assist accumulator. The assist hydraulic valve may be configured to open the assist hydraulic line in response to an operation error of the main braking part.

In an exemplary embodiment, the assist bypass part may include an assist bypass line and an assist bypass valve. The assist bypass line may include ends connected to the assist hydraulic line. The assist bypass line may be configured to cause, at least in part, hydraulic pressure to bypass the assist hydraulic valve and to move to the assist accumulator. The assist bypass valve may be configured to cause, at least in part, one direction of flow of the auxiliary hydraulic pressure in the assist bypass line.

In an exemplary embodiment, the electronic hydraulic brake device may further include a storage part connected to the pedal cylinder and configured to store hydraulic pressure. To this end, the assist braking part may further include an assist pump connected to the storage part. The assist pump may be configured to transfer the hydraulic pressure stored in the storage part to the assist accumulator.

In an exemplary embodiment, the assist braking part may include a first assist hydraulic part, a second assist hydraulic part, an assist accumulator, a first assist bypass part, a second assist bypass part, and an assist sensing part. The first assist hydraulic part may be connected to the first hydraulic part. The first assist hydraulic part may be configured to guide hydraulic pressure. The second assist hydraulic part may be connected to the second hydraulic part. The second assist hydraulic part may be configured to guide hydraulic pressure. The assist accumulator may be connected to the first and second assist hydraulic parts and may be filled with the auxiliary hydraulic pressure. The first assist bypass part may be configured to bypass the first assist hydraulic part to guide hydraulic pressure to the assist accumulator. The second assist bypass part may be configured to bypass the second assist hydraulic part to guide hydraulic pressure to the assist accumulator. The assist sensing part may be configured to determine the auxiliary hydraulic pressure of the assist accumulator.

In some aspects of an electronic hydraulic brake device, a main braking part and an assist braking part can be connected as a hydraulic pressure circuit to move hydraulic pressure, and auxiliary hydraulic pressure stored in an assist braking part can be moved to the main braking part and supplied to wheel cylinders in response to an operation error of the main braking part. Furthermore, in some aspects of an electronic hydraulic brake device, an assist pump can forcibly move braking fluid stored in a storage part to an assist accumulator. As such, in response to an operation error of the main braking part, auxiliary hydraulic pressure can be continuously supplied to the assist accumulator to perform vehicle braking.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

DETAILED DESCRIPTION OF THE ILLUSTRATED EMBODIMENTS

Figure 1:
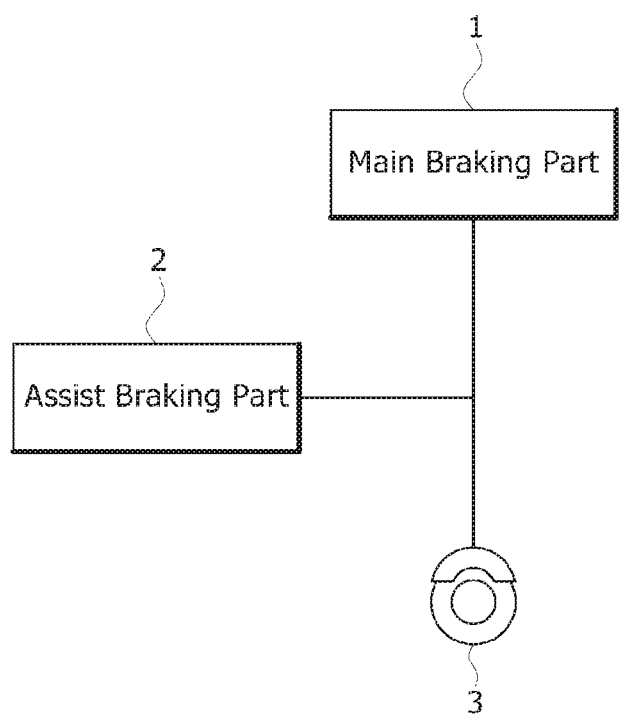
FIG. 1 is a diagram schematically illustrating an electronic hydraulic brake device according to an exemplary embodiment.

In the following description, for the purposes of explanation, numerous specific details are set forth in order to provide a thorough understanding of various exemplary embodiments. As used herein, the terms "embodiments" and "implementations" are used interchangeably and are non-limiting examples employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some exemplary embodiments. Therefore, unless otherwise specified, the features, components, modules, layers, films, panels, regions, aspects, etc. (hereinafter individually or collectively referred to as an "element" or "elements"), of the various illustrations may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. As such, the sizes and relative sizes of the respective elements are not necessarily limited to the sizes and relative sizes shown in the drawings. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element is referred to as being "on," "connected to," or "coupled to" another element, it may be directly on, connected to, or coupled to the other element or intervening elements may be present. When, however, an element is referred to as being "directly on," "directly connected to," or "directly coupled to" another element, there are no intervening elements present. Other terms and/or phrases used to describe a relationship between elements should be interpreted in a like fashion, e.g., "between" versus "directly between," "adjacent" versus "directly adjacent," "on" versus "directly on," etc. Further, the term "connected" may refer to physical, electrical, and/or fluid connection. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one element's relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional views, isometric views, perspective views, plan views, and/or exploded illustrations that are schematic illustrations of idealized exemplary embodiments and/or intermediate structures. As such, variations from the shapes of the illustrations as a result of, for example, manufacturing techniques and/or tolerances, are to be expected. Thus, exemplary embodiments disclosed herein should not be construed as limited to the particular illustrated shapes of regions, but are to include deviations in shapes that result from, for instance, manufacturing. To this end, regions illustrated in the drawings may be schematic in nature and shapes of these regions may not reflect the actual shapes of regions of a device, and, as such, are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Hereinafter, various exemplary embodiments of an electronic hydraulic brake device will be described with reference to the accompanying drawings.

FIG. 1 is a diagram schematically illustrating an electronic hydraulic brake device according to an exemplary embodiment.

Referring to FIG. 1, the electronic hydraulic brake device according to an exemplary embodiment includes a main braking part 1 and an assist braking part 2.

The main braking part 1 drives a motor to provide braking hydraulic pressure to a plurality of wheel cylinders, such as wheel cylinder 3. Hereinafter, wheel cylinder 3 will be referred to as the plurality of wheel cylinders 3. The assist braking part 2 is connected to the main braking part 1 and filled with high (or auxiliary) braking hydraulic pressure. The assist braking part 2 provides braking hydraulic pressure to the plurality of wheel cylinders 3 in response to an operation error of the main braking part 1.

According to some exemplary embodiments, the electronic hydraulic brake device may divide an electronic braking device of an electric vehicle, hybrid vehicle, or autonomous vehicle into at least two parts, e.g., the main braking part 1 and the assist braking part 2. When an operation error of the main braking part 1 occurs, the high braking hydraulic pressure stored in the assist braking part 2 may be rapidly supplied to the wheel cylinders 3 to perform emergency braking. The operation error of the main braking part 1 may indicate that the motor cannot be driven or may indicate operation error(s) of one or more valves for controlling a hydraulic circuit.

Figure 2:
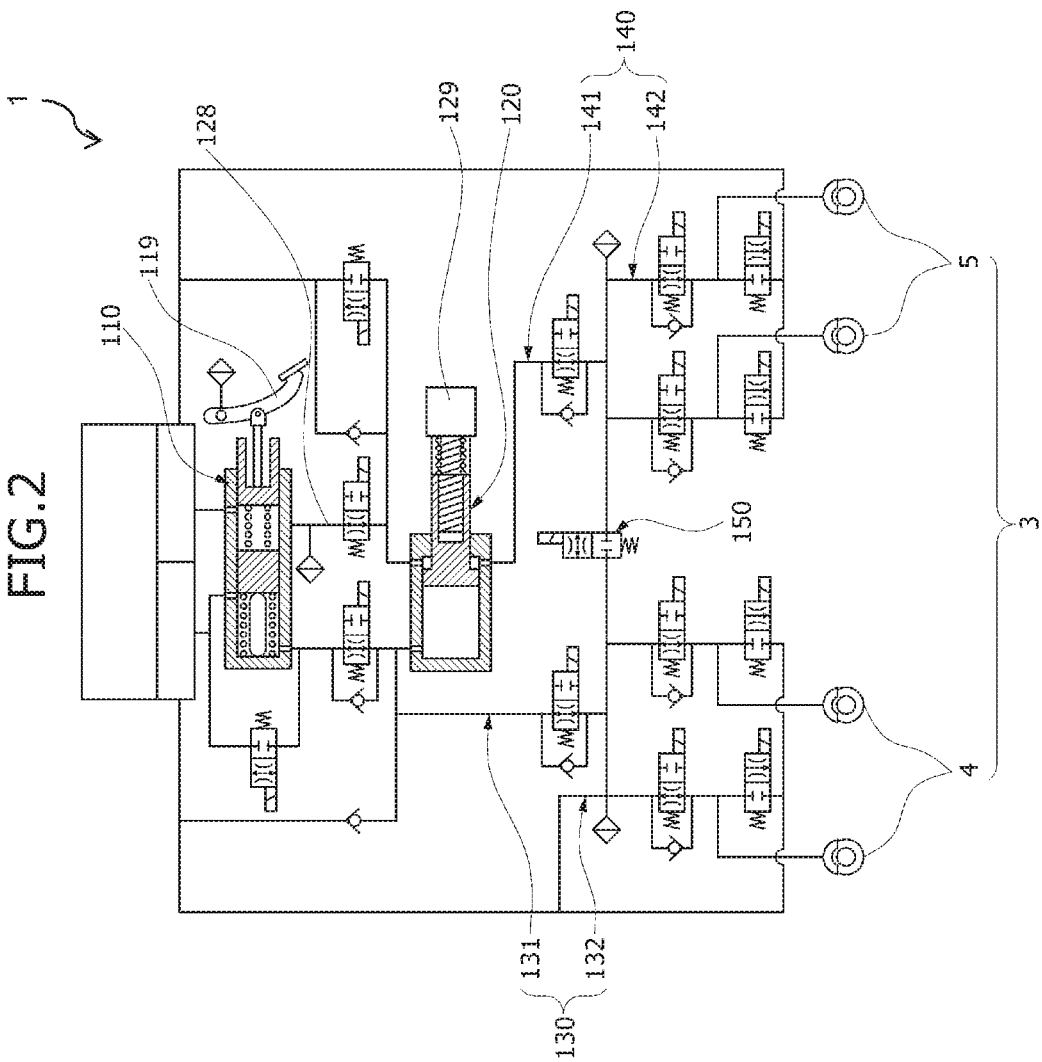
FIG. 2 is a diagram schematically illustrating a main braking part according to an exemplary embodiment.

FIG. 2 is a diagram schematically illustrating a main braking part according to an exemplary embodiment.

Referring to FIG. 2, the main braking part 1 according to an exemplary embodiment includes a pedal cylinder 110, a master cylinder 120, a first hydraulic part 130, a second hydraulic part 140, and a hydraulic connector 150.

The pedal cylinder 110 generates hydraulic pressure through pressurization of a pedal 119. Such a pedal cylinder 110 may form two chambers, and provide a stepping force to cope with the pressurization of the pedal 119.

The master cylinder 120 senses whether the pedal 119 is operated, and generates hydraulic pressure through an operation of a motor 129. The master cylinder 120 may form (or include) one or more chambers. The motor 129 may be driven in a forward or backward direction according to the pressurization state of the pedal 119. The master cylinder 120 may be connected to the pedal cylinder 110 through a cylinder line 128.

The first hydraulic part 130 is connected to the master cylinder 120, and guides braking pressure to some of the plurality of wheel cylinders 3. For example, the first hydraulic part 130 may guide hydraulic pressure to first wheel cylinders 4 mounted on any one of two front wheels and any one of two rear wheels, respectively.

For instance, the first hydraulic part 130 may include a first-first hydraulic line 131 connected to the master cylinder 120 to guide braking pressure, and a first-second hydraulic line 132 connected to the first-first hydraulic line 131 and diverging from the first-first hydraulic line 131 to guide braking pressure to the first wheel cylinders 4.

The second hydraulic part 140 is connected to the master cylinder 120, and guides braking pressure to others of the plurality of wheel cylinders 3. For example, the second hydraulic part 140 may guide hydraulic pressure to second wheel cylinders 5 mounted on the other one of the two front wheels and the other one of the two rear wheels, respectively.

For instance, the second hydraulic part 140 may include a second-first hydraulic line 141 connected to the master cylinder 120 to guide braking pressure, and a second-second hydraulic line 142 connected to the second-first hydraulic line 141 and diverging from the second-first hydraulic line 141 to guide braking pressure to the second wheel cylinders 5.

The hydraulic connector 150 connects (e.g., fluidly connects) the first and second hydraulic parts 130 and 140 or removes the connection, e.g., prevents hydraulic flow between the first and second hydraulic parts 130 and 150. For example, the hydraulic connector 150 may connect the first-second hydraulic line 132 and the second-second hydraulic line 142.

Figure 3:
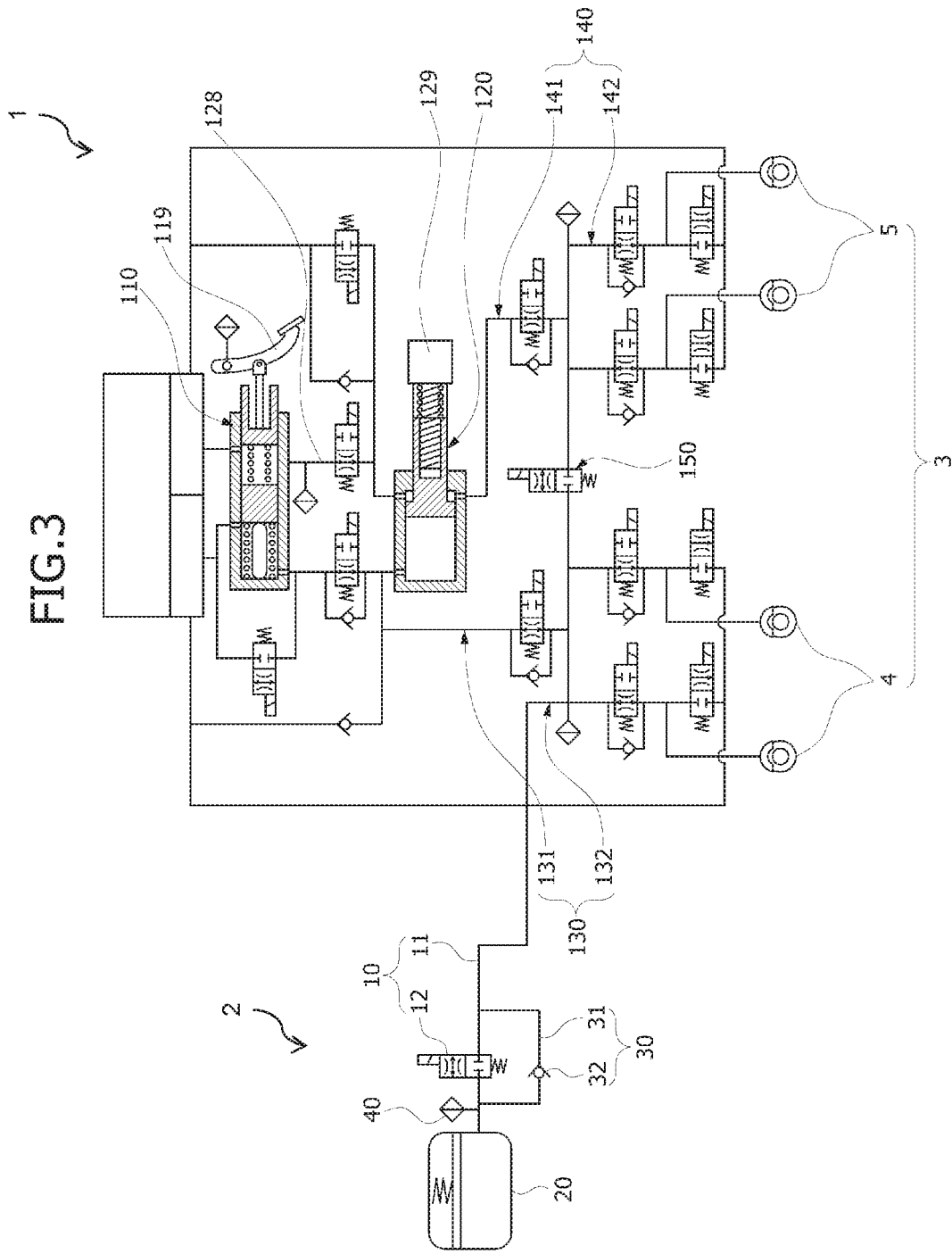
FIG. 3 is a diagram schematically illustrating an assist braking part connected to the main braking part of FIG. 2 according to an exemplary embodiment.
Figure 4:
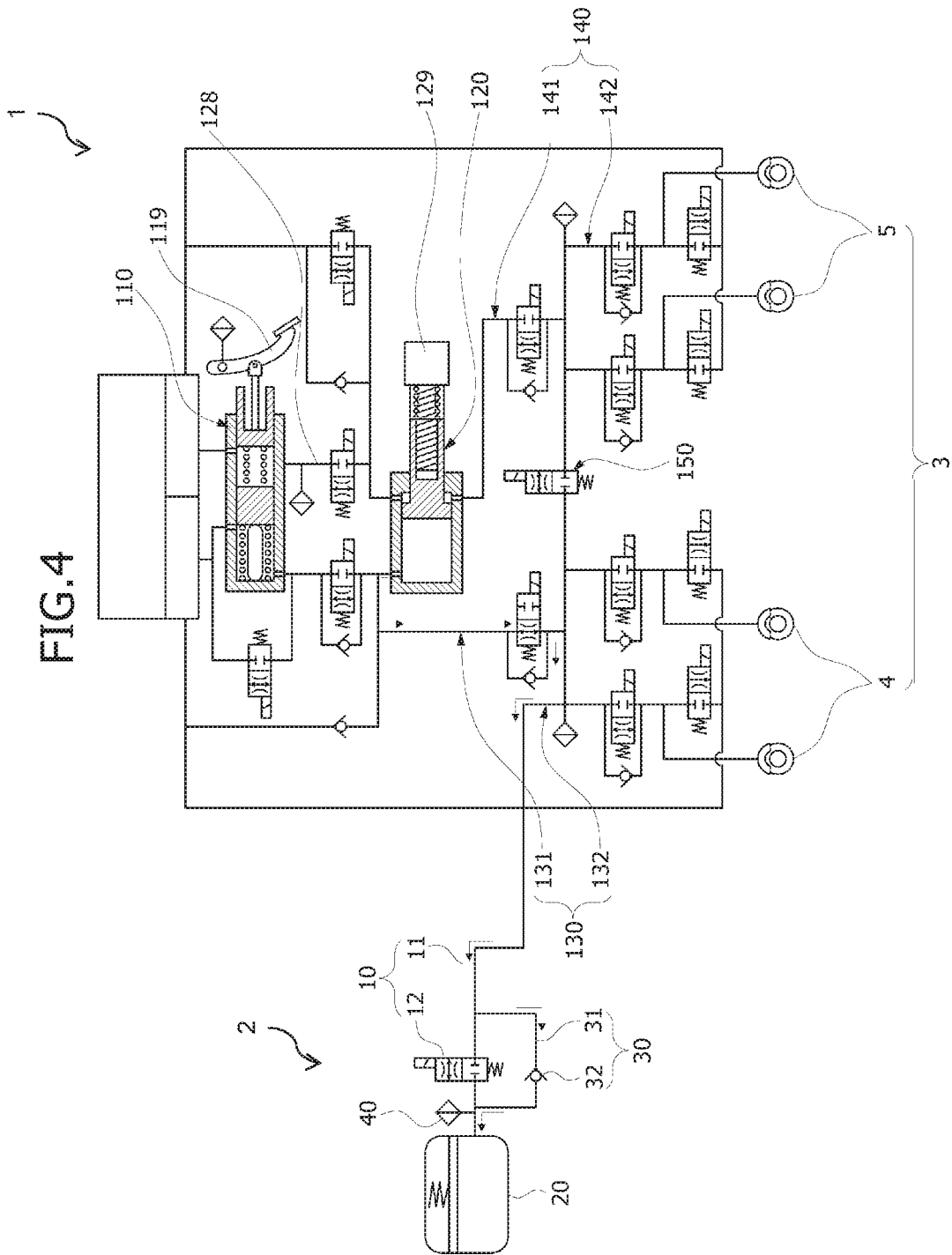
FIG. 4 is a diagram schematically illustrating a hydraulic pressure flow through the electronic hydraulic brake device of FIG. 3, and in which an assist accumulator is filled with high braking hydraulic pressure according to an exemplary embodiment.
Figure 5:
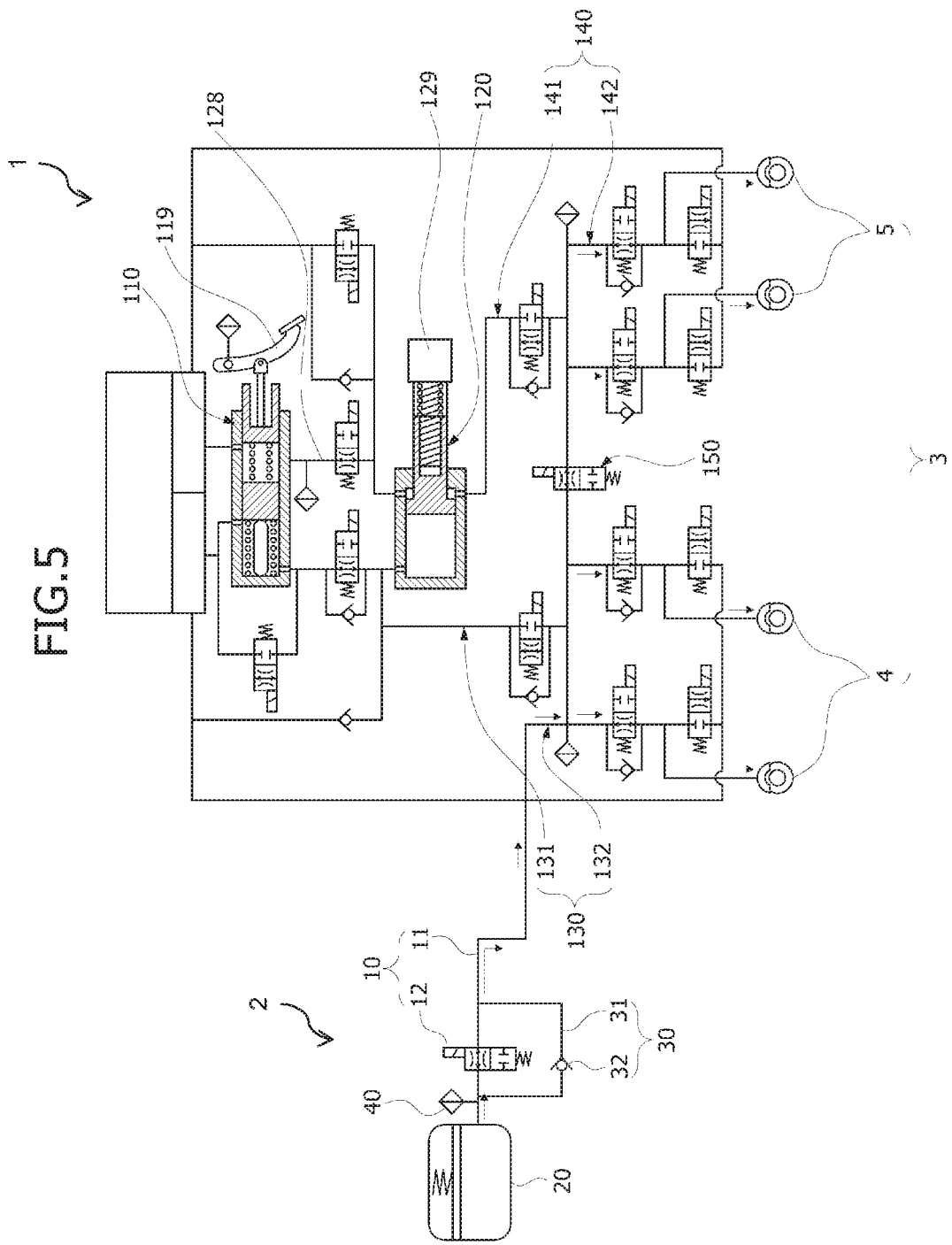
FIG. 5 is a diagram schematically illustrating a hydraulic pressure flow through the electronic hydraulic brake device of FIG. 3, and in which the high braking hydraulic pressure stored in the assist accumulator is supplied to one or more wheel cylinders according to an exemplary embodiment.

FIG. 3 is a diagram schematically illustrating an assist braking part connected to the main braking part of FIG. 2 according to an exemplary embodiment. FIG. 4 is a diagram schematically illustrating a hydraulic pressure flow through the electronic hydraulic brake device of FIG. 3, and in which an assist accumulator is filled with high braking hydraulic pressure according to an exemplary embodiment. FIG. 5 is a diagram schematically illustrating a hydraulic pressure flow through the electronic hydraulic brake device of FIG. 3, and in which the high braking hydraulic pressure stored in the assist accumulator is supplied to one or more wheel cylinders according to an exemplary embodiment.

Referring to FIG. 3, the assist braking part 2 includes an assist hydraulic part 10, an assist accumulator 20, an assist bypass part 30, and an assist sensing part 40. In one operational state, the hydraulic connector 150 may allow movement of braking hydraulic pressure between the first and second hydraulic parts 130 and 140.

The assist hydraulic part 10 is connected to any one of the first and second hydraulic parts 130 and 140 to guide braking hydraulic pressure. For example, the assist hydraulic part 10 may be connected to the first-second hydraulic line 132 or the second-second hydraulic line 142. As an example, FIG. 3 illustrates the assist hydraulic part 10 connected to the first-second hydraulic line 132.

The assist accumulator 20 may be connected to the assist hydraulic part 10 and may be filled with high braking hydraulic pressure.

The assist bypass part 30 bypasses the assist hydraulic part 10 to guide braking hydraulic pressure to the assist accumulator 20. For example, the assist accumulator 20 may be filled with the braking hydraulic pressure through the assist bypass part 30. The braking hydraulic pressure of the assist accumulator 20 may be moved to the first or second hydraulic part 130 or 140 through the assist hydraulic part 10.

The assist sensing part 40 measures the braking hydraulic pressure of the assist accumulator 20. For example, the assist sensing part 40 may be formed in (or otherwise in communication with) the assist hydraulic part 10 or the assist accumulator 20 to measure the braking hydraulic pressure.

In an operational state, the motor 129 may be driven to fill the assist accumulator 20 with high braking hydraulic pressure at an initial stage. For instance, braking hydraulic pressure generated by the master cylinder 120 can be moved to the assist accumulator 20. At this time, the movement of the braking hydraulic pressure to the cylinder line 128 is restrained, and the movement of the braking hydraulic pressure to the first and second wheel cylinders 4 and 5 is also restrained (see FIG. 4).

When an operation error of the main braking part 1 occurs in a state in which vehicle braking is required, the high braking hydraulic pressure stored in the assist accumulator 20 is moved to the first-second hydraulic line 132 and/or the second-second hydraulic line 142, and then moved to the first wheel cylinders 4 and the second wheel cylinders 5. At this time, the movement of the braking hydraulic pressure to the first-first hydraulic line 131 and the second-first hydraulic line 141 is restrained (see FIG. 5).

When the first-first hydraulic line 131 and the second-first hydraulic line 141 are opened with the vehicle braked by the assist braking part 2, the braking hydraulic pressure of the wheel cylinders 3 may be relieved. When the braking hydraulic pressure is to be rapidly relieved as in vehicle posture control, the braking hydraulic pressure applied to the wheel cylinders 3 may be adjusted through valve control of the first-second hydraulic line 132 and the second-second hydraulic line 142.

The assist hydraulic part 10 includes an assist hydraulic line 11 and an assist hydraulic valve 12. The assist hydraulic line 11 has one end connected to any one of the first and second hydraulic parts 130 and 140 and the other end connected to the assist accumulator 20 via the assist hydraulic valve 12. For example, the assist hydraulic line 11 may have one end connected to the first-second hydraulic line 132 or the second-second hydraulic line 142. As shown in FIG. 3, the assist hydraulic line 11 is connected to the first-second hydraulic line 132. The assist hydraulic valve 12 is formed on (or connected to) the assist hydraulic line 11, and opens the assist hydraulic line 11 when an operation error of the main braking part 1 occurs.

The assist bypass part 30 includes an assist bypass line 31 and an assist bypass valve 32. The assist bypass line 31 has both ends connected to the assist hydraulic line 11, and induces braking hydraulic pressure to move to the assist accumulator 20 by bypassing the assist hydraulic valve 12. The assist bypass valve 32 is formed on the assist bypass line 31 and allows braking hydraulic pressure to move in one direction. For example, when the assist accumulator 20 is to be filled with braking hydraulic pressure, the assist hydraulic valve 12 may close the assist hydraulic line 11 so that the braking hydraulic pressure can move through the assist bypass line 31 to the assist accumulator 20. A check valve capable of allowing braking fluid to move in one direction may be used as the assist bypass valve 32.

Figure 6:
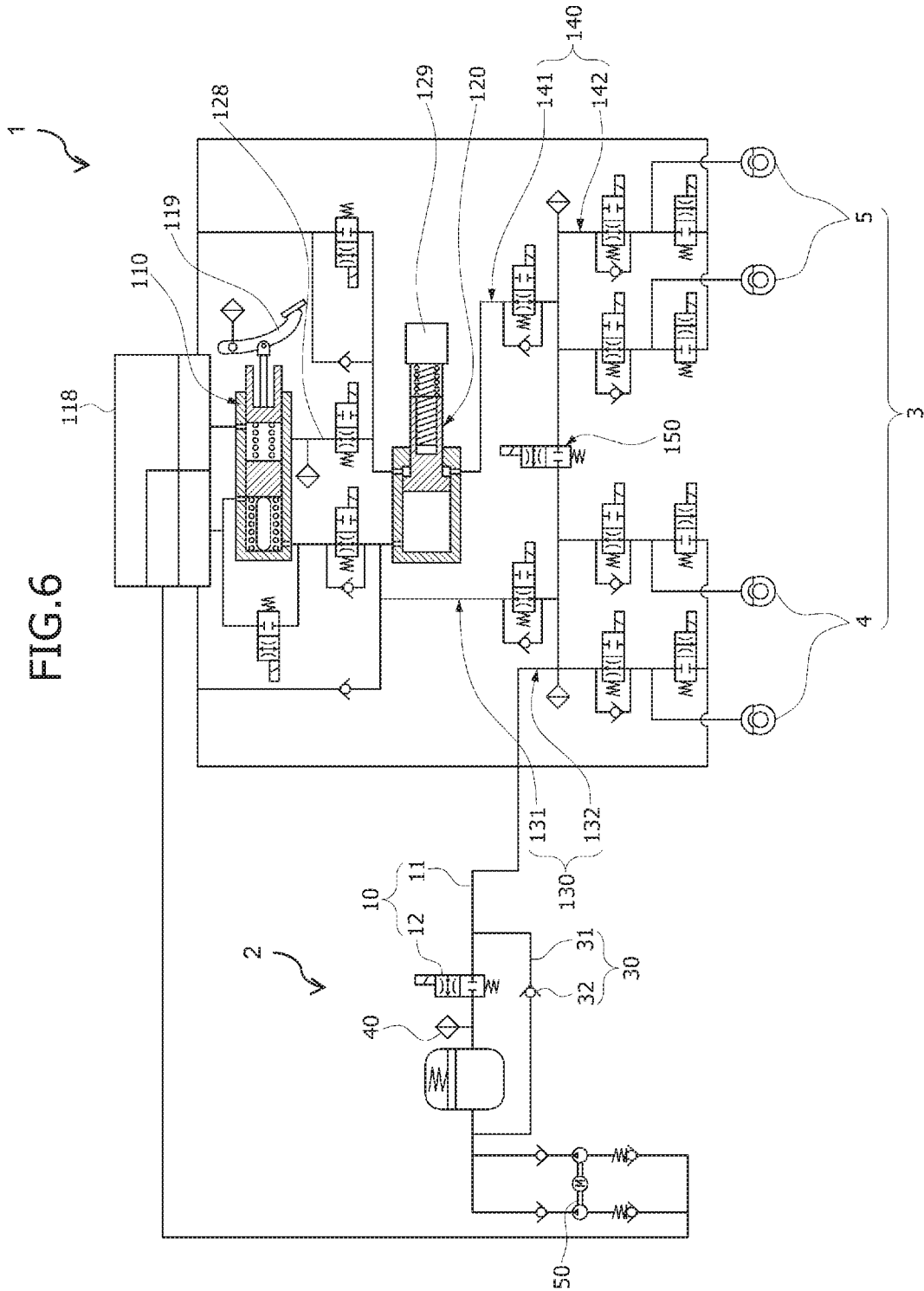
FIG. 6 is a diagram schematically illustrating an assist pump added to the assist braking part of FIG. 2 according to an exemplary embodiment.

FIG. 6 is a diagram schematically illustrating an assist pump added to the assist braking part of FIG. 2 according to an exemplary embodiment.

Referring to FIG. 6, the assist braking part 2 according to an exemplary embodiment may further include an assist pump 50. The assist pump 50 is connected to a storage part 118, which can be connected to the pedal cylinder 110 to temporarily store braking hydraulic pressure, and forcibly transfer the braking hydraulic pressure stored in the storage part 118 to the assist accumulator 20. Since the braking hydraulic pressure can be continuously supplied to the assist accumulator 20 through the assist pump 50, vehicle braking can be continuously performed even when an operation error of the main braking part 1, such as a fault of the motor 129, occurs.

Figure 7:
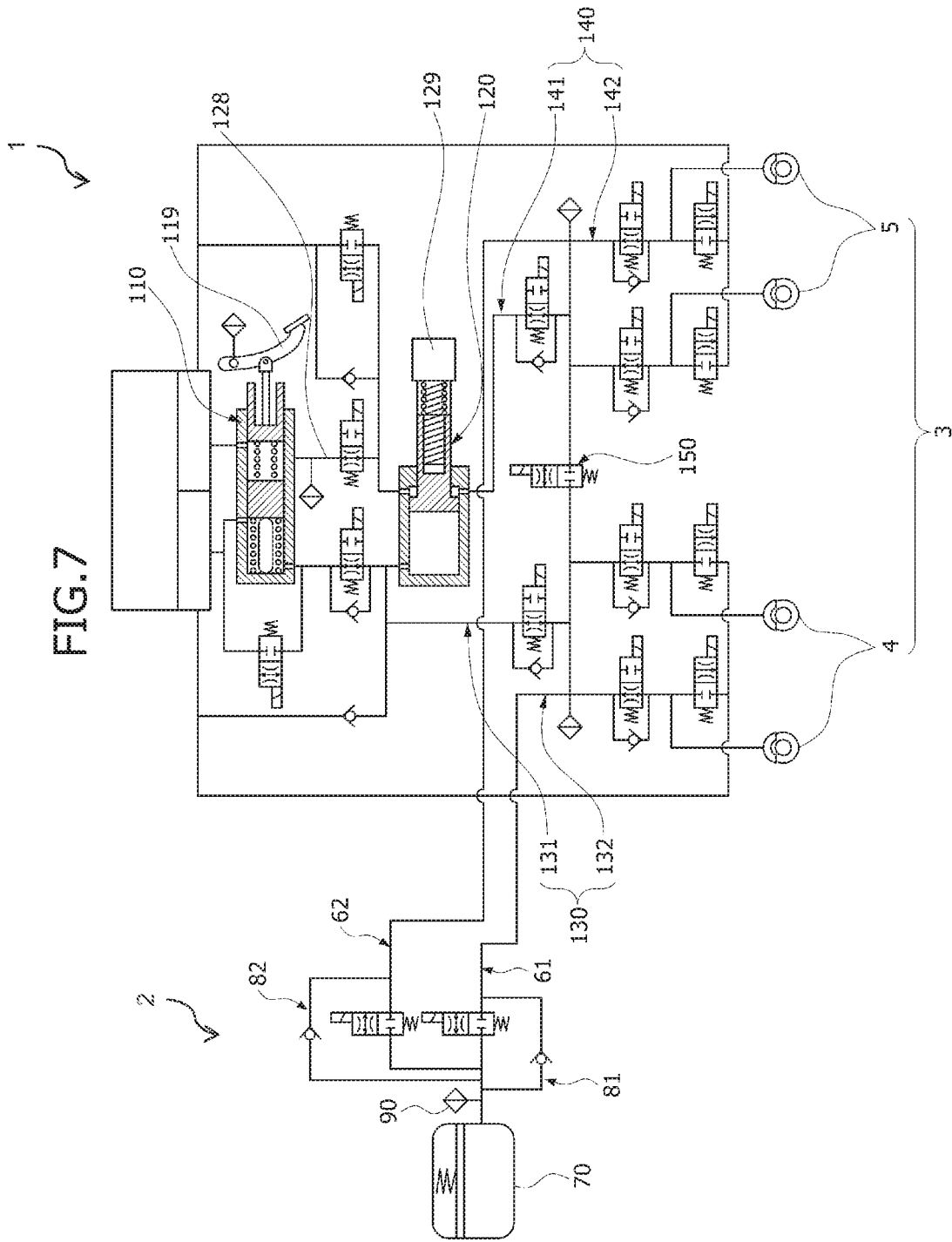
FIG. 7 is a diagram schematically illustrating an assist braking part connected to the main braking part of FIG. 2 according to an exemplary embodiment.

FIG. 7 is a diagram schematically illustrating an assist braking part connected to the main braking part of FIG. 2 according to an exemplary embodiment.

Referring to FIG. 7, the assist braking part 2 according to an exemplary embodiment includes a first assist hydraulic part 61, a second assist hydraulic part 62, an assist accumulator 70, a first assist bypass part 81, a second assist bypass part 82, and an assist sensing part 90. In an operational state, the hydraulic connector 150 restrains the movement of braking hydraulic pressure between the first hydraulic part 130 and the second hydraulic part 140, and maintains the state in which the first and second hydraulic parts 130 and 140 are divided with respect to hydraulic fluid flow.

The first assist hydraulic part 61 is connected to the first hydraulic part 130 to guide braking hydraulic pressure, and the second assist hydraulic part 62 is connected to the second hydraulic part 140 to guide braking hydraulic pressure. For example, the first assist hydraulic part 61 may connect the first-second hydraulic line 132 to the assist accumulator 70, and the second assist hydraulic part 62 may connect the second-second hydraulic line 142 to the assist accumulator 70 or the first assist hydraulic part 61.

The assist accumulator 70 can be connected to the first and second assist hydraulic parts 61 and 62 and filled with high braking hydraulic pressure.

The first assist bypass part 81 bypasses a first assist hydraulic valve of the first assist hydraulic part 61 to guide braking hydraulic pressure to the assist accumulator 70, and the second assist bypass part 82 bypasses a second assist hydraulic valve of the second assist hydraulic part 62 to guide braking hydraulic pressure to the assist accumulator 70. For example, the assist accumulator 70 may be filled with braking hydraulic pressure through at least one of the first and second assist bypass parts 81 and 82, and the braking hydraulic pressure of the assist accumulator 70 may be moved to each of the first and second assist bypass parts 81 and 82.

The assist sensing part 90 measures the braking hydraulic pressure of the assist accumulator 70. For example, the assist sensing part 90 may be formed in (or otherwise in communication with) the first and second assist hydraulic parts 61 and 62 and/or the assist accumulator 70 to measure the braking hydraulic pressure.

In an operational state, the motor 129 may be driven to fill the assist accumulator 70 with high braking hydraulic pressure at an initial stage. Then, the braking hydraulic pressure generated by the master cylinder 120 can be moved to the assist accumulator 70. At this time, the movement of the braking hydraulic pressure to the cylinder line 128 is restrained, and the movement of the braking hydraulic pressure to the first and second wheel cylinders 4 and 5 is also restrained.

When an operation error of the main braking part 1 occurs in a state in which vehicle braking is required, the high braking hydraulic pressure stored in the assist accumulator 70 is moved to the first-second hydraulic line 132 and the second-second hydraulic line 142 via the first and second hydraulic assist parts 61 and 62, respectively, and then moved to the first wheel cylinders 4 and the second wheel cylinders 5. At this time, the movement of braking hydraulic pressure to the first-first hydraulic line 131 and the second-first hydraulic line 141 is restrained.

When the first-first hydraulic line 131 and the second-first hydraulic line 141 are opened with the vehicle braked by the assist braking part 2, the braking hydraulic pressure of the wheel cylinders 3 may be relieved. When the braking hydraulic pressure is to be rapidly relieved as in vehicle posture control, braking hydraulic pressure applied to the wheel cylinders 3 may be adjusted through valve control of the first-second hydraulic line 132 and the second-second hydraulic line 142.

More detailed structures of the first and second assist hydraulic parts 61 and 62 may correspond to that of the assist hydraulic part 10 of FIG. 3, and more detailed structures of the first and second assist bypass parts 81 and 82 may correspond to that of the assist bypass part 30 of FIG. 3. It is also contemplated that the assist pump 50 of FIG. 6 may be applied to the assist accumulator 70 of FIG. 7.

Figure 8:
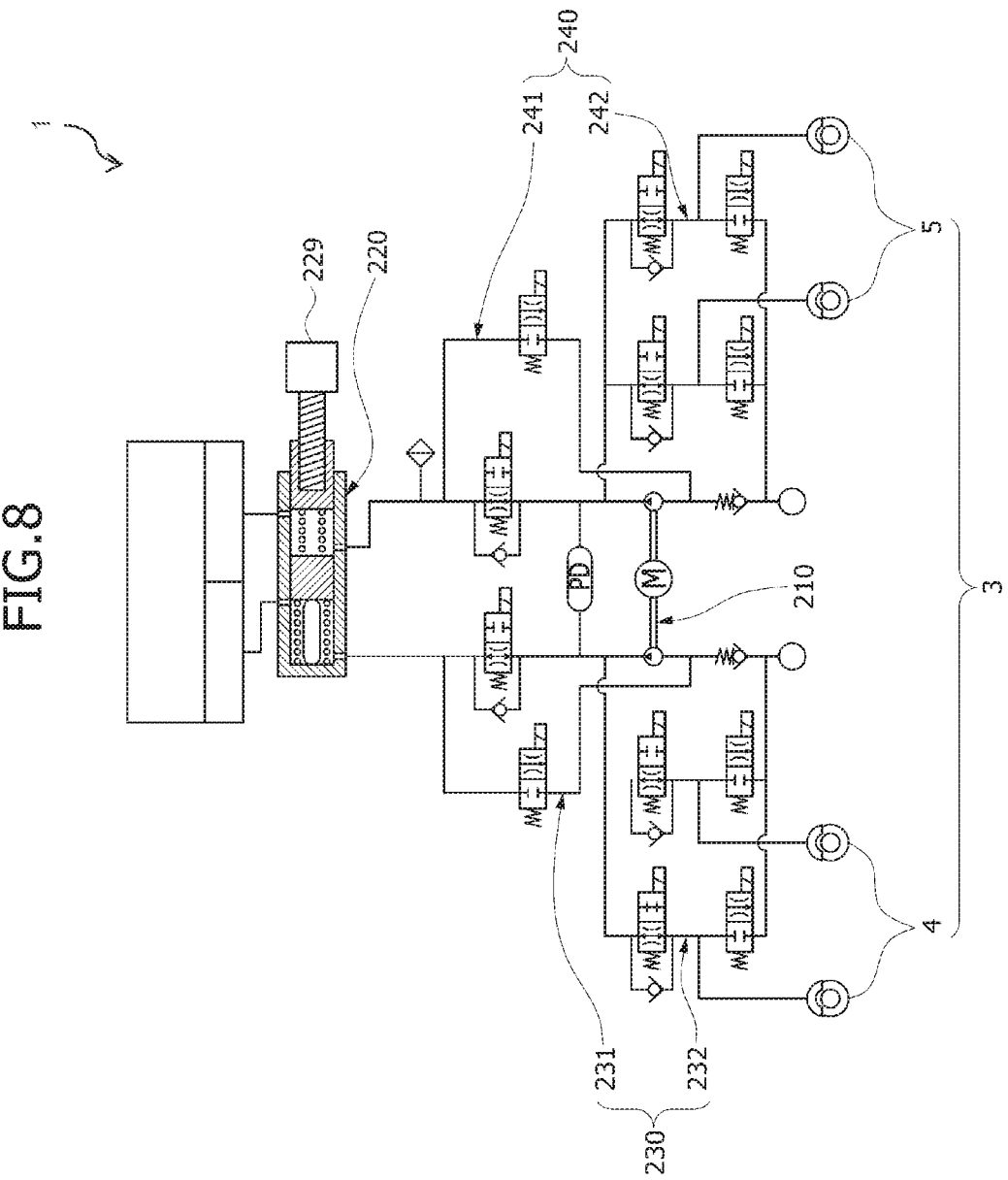
FIG. 8 is a diagram schematically illustrating a main braking part according to an exemplary embodiment.

FIG. 8 is a diagram schematically illustrating a main braking part according to an exemplary embodiment.

Referring to FIG. 8, a main braking part 1 according to an exemplary embodiment includes a main motor pump 210, a master cylinder 220, a first hydraulic part 230, and a second hydraulic part 240.

The master cylinder 220 generates hydraulic pressure through an operation of a motor 229. The master cylinder 220 may form two chambers, and the motor 229 may be driven in a forward or backward direction according to a pressurization state of a pedal. In some exemplary embodiments, the pedal may be in communication with the master cylinder 220 to cause operation of the motor 229 to facilitate hydraulic fluid flow. In some exemplary embodiments, the pedal may be in communication with the motor 229 to cause operation of the master cylinder 220.

The first hydraulic part 230 is connected to the master cylinder 220, and guides braking pressure to some of the plurality of wheel cylinders 3. For example, the first hydraulic part 230 may guide hydraulic pressure to the first wheel cylinders 4 mounted on any one of two front wheels and any one of two rear wheels, respectively.

The second hydraulic part 240 is connected to the master cylinder 220, and guides braking pressure to the others of the plurality of wheel cylinders 3. For example, the second hydraulic part 240 may guide hydraulic pressure to the second wheel cylinders 5 mounted on the other one of the two front wheels and the other one of the two rear wheels, respectively.

The main motor pump 210 is connected to the first and second hydraulic parts 230 and 240 to amplify braking hydraulic pressure.

The first hydraulic part 230 may include a first-first hydraulic line 231 connecting the master cylinder 220 to the main motor pump 210 and a first-second hydraulic line 232 connected to the first-first hydraulic line 231 and diverging from the first-first hydraulic line 231 to guide braking pressure to the first wheel cylinders 4.

The second hydraulic part 240 may include a second-first hydraulic line 241 connecting the master cylinder 220 to the main motor pump 210 and a second-second hydraulic line 242 connected to the second-first hydraulic line 241 and diverging from the second-first hydraulic line 241 to guide braking pressure to the second wheel cylinders 5.

Figure 9:
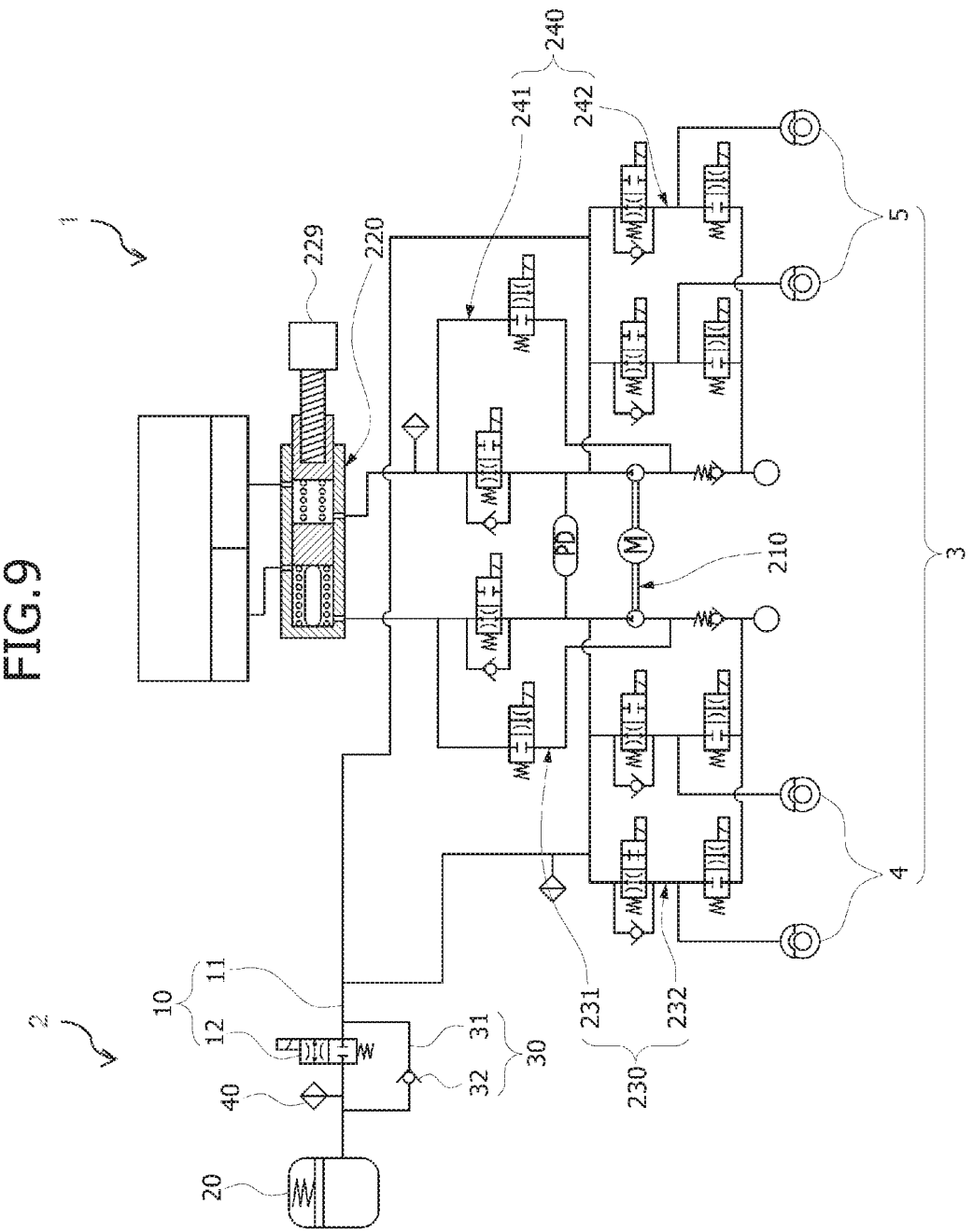
FIG. 9 is a diagram schematically illustrating an assist braking part connected to the main braking part of FIG. 8 according to an exemplary embodiment.
Figure 10:
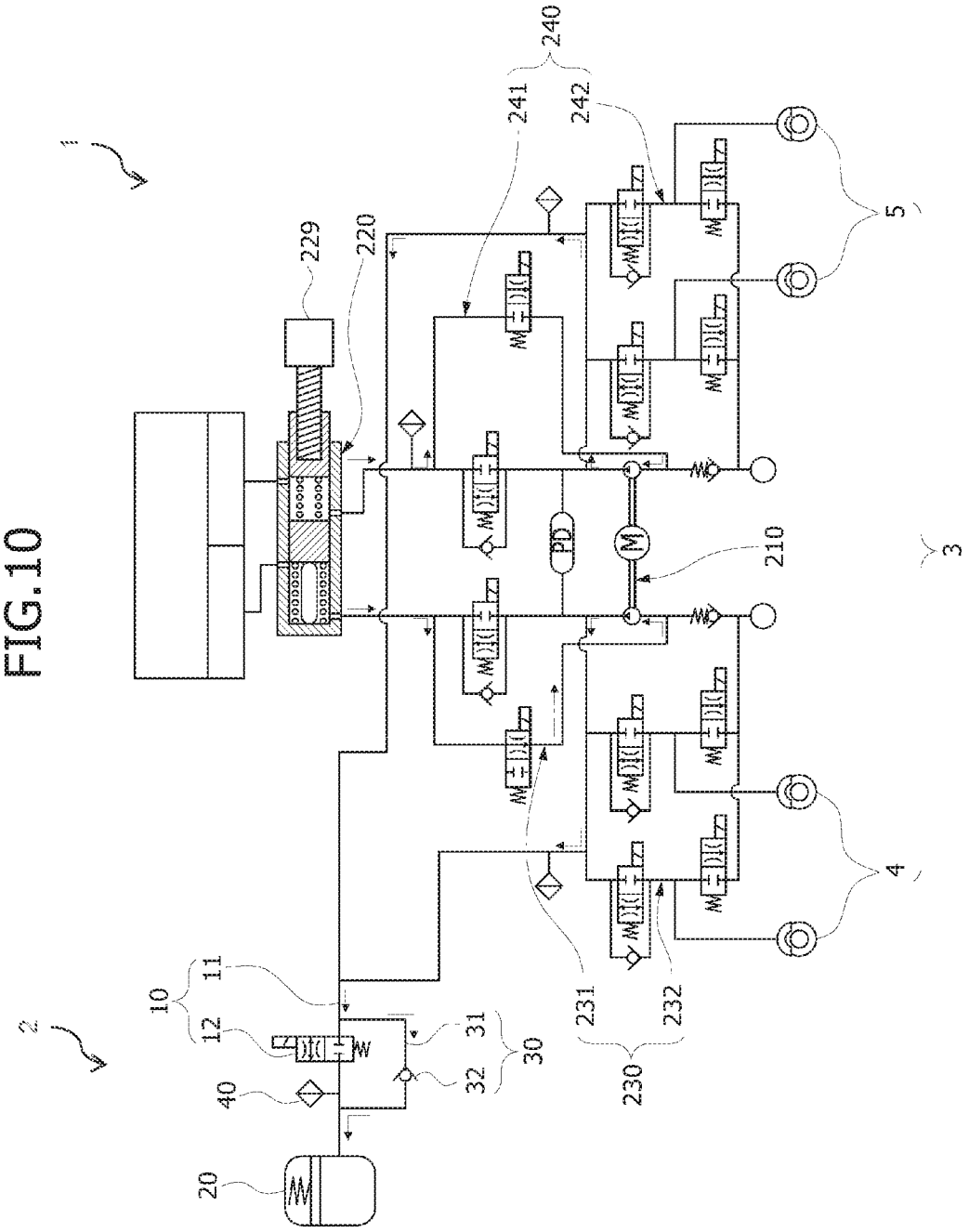
FIG. 10 is a diagram schematically illustrating a hydraulic pressure flow through the electronic hydraulic brake device of FIG. 9, and in which an assist accumulator is filled with high braking hydraulic pressure according to an exemplary embodiment.
Figure 11:
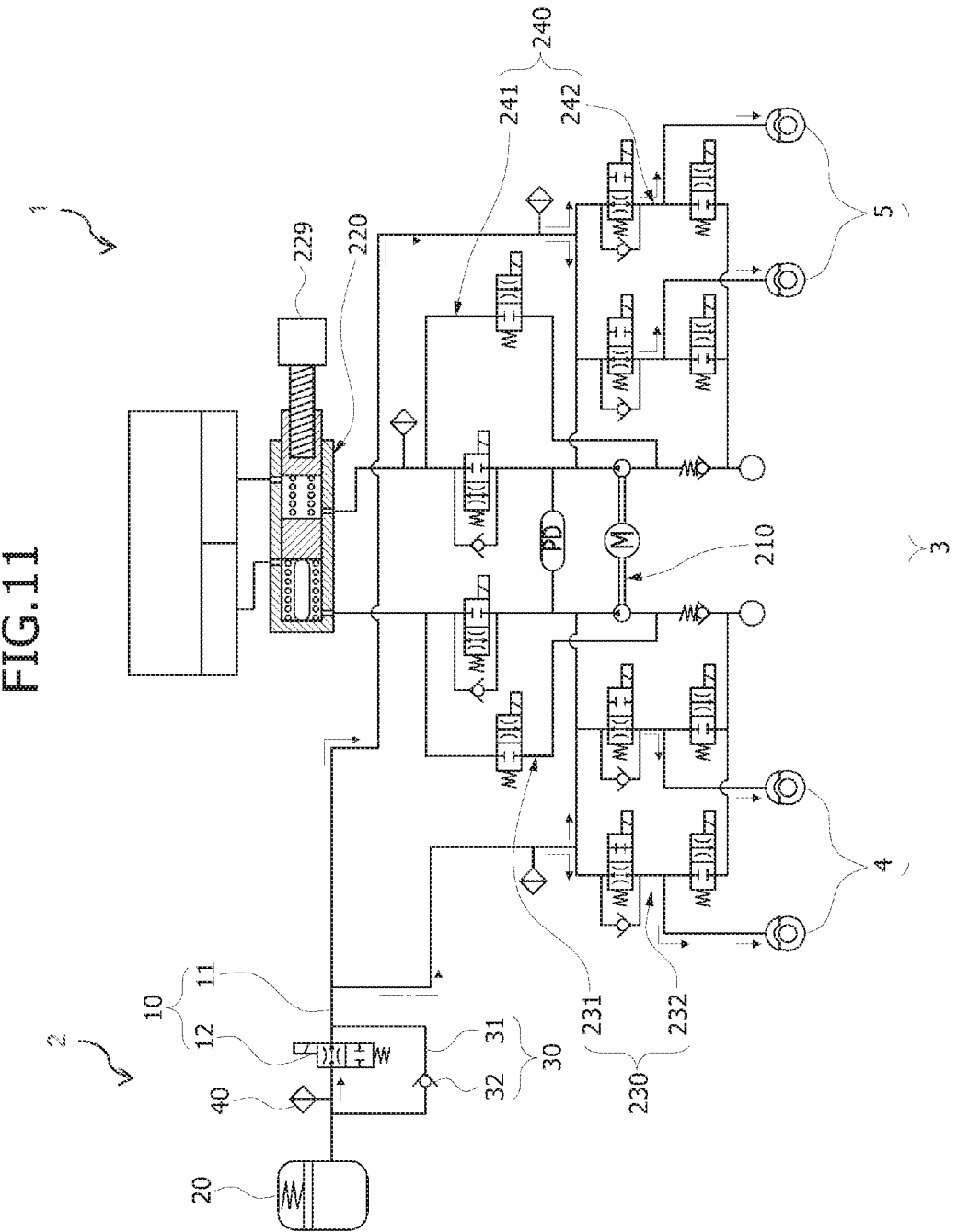
FIG. 11 is a diagram schematically illustrating a hydraulic pressure flow through the electronic hydraulic brake device of FIG. 9, and in which high braking hydraulic pressure stored in an assist accumulator is supplied to one or more wheel cylinders according to an exemplary embodiment.

FIG. 9 is a diagram schematically illustrating an assist braking part connected to the main braking part of FIG. 8 according to an exemplary embodiment. FIG. 10 is a diagram schematically illustrating a hydraulic pressure flow through the electronic hydraulic brake device of FIG. 9, and in which an assist accumulator is filled with high braking hydraulic pressure according to an exemplary embodiment. FIG. 11 is a diagram schematically illustrating a hydraulic pressure flow through the electronic hydraulic brake device of FIG. 9, and in which high braking hydraulic pressure stored in an assist accumulator is supplied to one or more wheel cylinders according to an exemplary embodiment.

Referring to FIG. 9, the assist braking part 2 includes an assist hydraulic part 10, an assist accumulator 20, an assist bypass part 30, and an assist sensing part 40.

The assist hydraulic part 10 is connected to the first and second hydraulic parts 230 and 240 to guide braking hydraulic pressure. For example, the assist hydraulic part 10 may be connected to the first-second hydraulic line 232 and the second-second hydraulic line 242.

The assist accumulator 20 can be connected to the assist hydraulic part 10 and filled with high braking hydraulic pressure.

The assist bypass part 30 bypasses an assist hydraulic valve 12 of the assist hydraulic part 10 to guide braking hydraulic pressure to the assist accumulator 20. For example, the assist accumulator 20 may be filled with the braking hydraulic pressure through the assist bypass part 30, and the braking hydraulic pressure of the assist accumulator 20 may be moved to the first and second hydraulic parts 230 and 240 through the assist hydraulic part 10.

The assist sensing part 40 measures the braking hydraulic pressure of the assist accumulator 20. For example, the assist sensing part 40 may be formed in (or connected to) at least one of the assist hydraulic part 10 and the assist accumulator 20 to measure braking hydraulic pressure.

In an operational state, the motor 229 and the main motor pump 210 may be driven to fill the assist accumulator 20 with high braking hydraulic pressure at an initial stage. Then, the braking hydraulic pressure generated by the master cylinder 220 is supplied to the main motor pump 210 through the first-first hydraulic line 231 and the second-first hydraulic line 241, and the braking hydraulic pressure having passed through the main motor pump 210 is moved to the assist accumulator 20 through the assist hydraulic part 10 connected to the first-second hydraulic line 232 and the second-second hydraulic line 242. At this time, the movement of braking hydraulic pressure from the main motor pump 210 to the master cylinder 220 is restrained, and the movement of braking hydraulic pressure to the first and second wheel cylinders 4 and 5 is restrained (see FIG. 10).

When an operation error of the main braking part 1 occurs in the case that vehicle braking is required, the high braking hydraulic pressure stored in the assist accumulator 20 is moved to the first-second hydraulic line 232 and the second-second hydraulic line 242, and then moved to the first wheel cylinders 4 and the second wheel cylinders 5. At this time, the movement of braking hydraulic pressure to the first-first hydraulic line 231 and the second-first hydraulic line 241 is restrained (see FIG. 11).

When the first-first hydraulic line 231 and the second-first hydraulic line 241 are opened with the vehicle braked by the assist braking part 2, the braking hydraulic pressure of the wheel cylinders 3 may be relieved. When the braking hydraulic pressure is to be rapidly relieved as in vehicle posture control, the braking hydraulic pressure applied to the wheel cylinders 3 may be adjusted through valve control of the first-second hydraulic line 232 and the second-second hydraulic line 242.

The assist hydraulic part 10 includes an assist hydraulic line 11 and an assist hydraulic valve 12. One end of the assist hydraulic line 11 is connected to the first and second hydraulic parts 230 and 240, and the other end of the assist hydraulic line 11 is connected to the assist accumulator 20 via the assist hydraulic valve 12. For example, the assist hydraulic line 11 may have one end connected to the first-second hydraulic line 232 and the second-second hydraulic line 242. The assist hydraulic valve 12 is formed on (or connected to) the assist hydraulic line 11, and opens the assist hydraulic line 11 when an operation error of the main braking part 1 occurs.

The assist bypass part 30 includes an assist bypass line 31 and an assist bypass valve 32. The assist bypass line 31 has both ends connected to the assist hydraulic line 11, and induces braking hydraulic pressure to bypass the assist hydraulic valve 12 and to move to the assist accumulator 20. The assist bypass valve 32 is formed on (or connected to) the assist bypass line 31 and allows braking hydraulic pressure to move in one direction. For example, when the assist accumulator 20 is filled with braking hydraulic pressure, the assist hydraulic valve 12 may close the assist hydraulic line 11 such that the braking hydraulic pressure moves through the assist bypass line 31. At this time, a check valve capable of allowing braking fluid to move in one direction may be used as the assist bypass valve 32.

Figure 12:
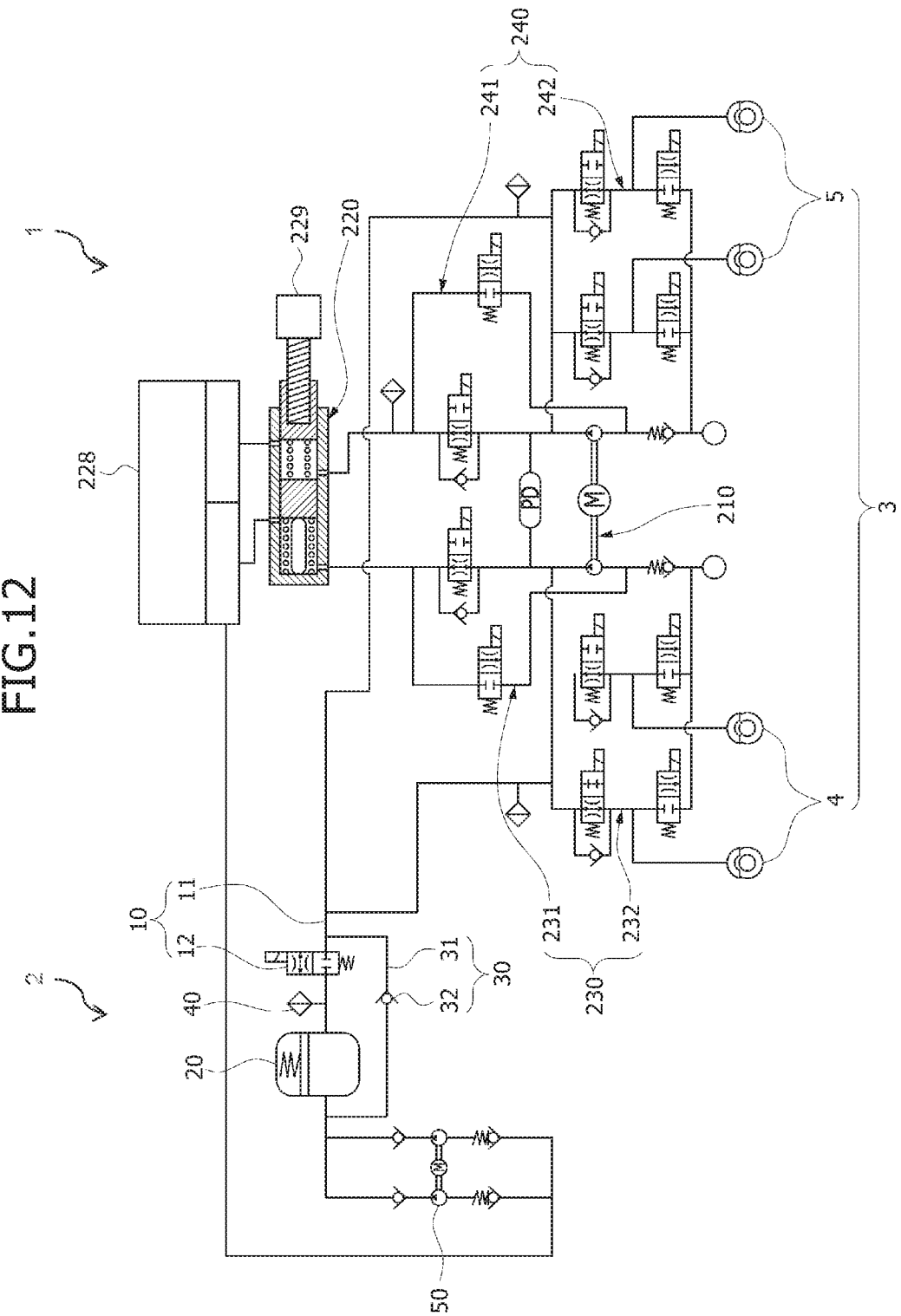
FIG. 12 is a diagram schematically illustrating an assist pump added to the assist braking part of FIG. 9 according to an exemplary embodiment.

FIG. 12 is a diagram schematically illustrating an assist pump added to the assist braking part of FIG. 9 according to an exemplary embodiment.

Referring to FIG. 12, the assist braking part 2 according to an exemplary embodiment may further include an assist pump 50. The assist pump 50 is connected to a storage part 228, which can be connected to the master cylinder 220 to temporarily store braking hydraulic pressure, and forcibly transfer the braking hydraulic pressure stored in the storage part 228 to the assist accumulator 20. Since braking hydraulic pressure can be continuously supplied to the assist accumulator 20 through the assist pump 50, vehicle braking can be continuously performed even when an operation error of the main braking part 1, such as a fault of the motor 229, occurs.

Figure 13:
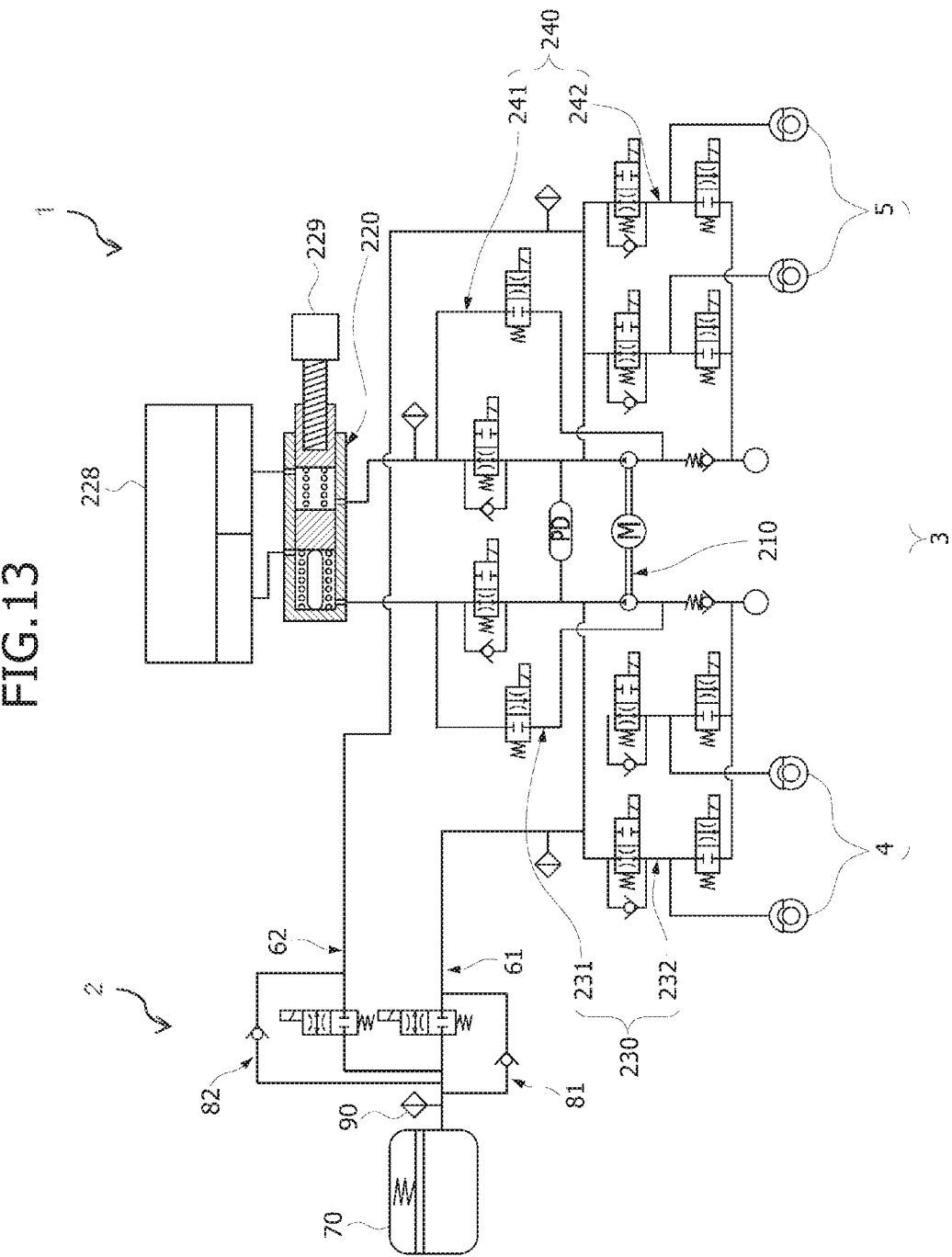
FIG. 13 is a diagram schematically illustrating an assist braking part connected to the main braking part of FIG. 8 according to an exemplary embodiment.

FIG. 13 is a diagram schematically illustrating an assist braking part connected to the main braking part of FIG. 8 according to an exemplary embodiment.

Referring to FIG. 13, the assist braking part 2 includes a first assist hydraulic part 61, a second assist hydraulic part 62, an assist accumulator 70, a first assist bypass part 81, a second assist bypass part 82, and an assist sensing part 90.

The first assist hydraulic part 61 is connected to the first hydraulic part 230 to guide braking hydraulic pressure, and the second assist hydraulic part 62 is connected to the second hydraulic part 240 to guide braking hydraulic pressure. For example, the first assist hydraulic part 61 may connect the first-second hydraulic line 232 to the assist accumulator 70, and the second assist hydraulic part 62 may connect the second-second hydraulic line 242 to the assist accumulator 70 or the first assist hydraulic part 61.

The assist accumulator 70 can be connected to the first and second assist hydraulic parts 61 and 62, and can be filled with high braking hydraulic pressure.

The first assist bypass part 81 bypasses a first assist hydraulic valve of the first assist hydraulic part 61 to guide braking hydraulic pressure to the assist accumulator 70, and the second assist bypass part 82 bypasses a second assist hydraulic valve of the second assist hydraulic part 62 to guide braking hydraulic pressure to the assist accumulator 70. For example, the assist accumulator 70 may be filled with braking hydraulic pressure through at least one of the first and second assist bypass parts 81 and 82, and the braking hydraulic pressure of the assist accumulator 70 may be moved to each of the first and second assist bypass parts 81 and 82.

The assist sensing part 90 measures the braking hydraulic pressure of the assist accumulator 70. For example, the assist sensing part 90 may be formed in (or connected to) at least one of the first and second assist hydraulic parts 61 and 62 or the assist accumulator 70 to measure braking hydraulic pressure.

In an operational state, the motor 229 can be driven to fill the assist accumulator 70 with high braking hydraulic pressure at an initial stage. Then, the braking hydraulic pressure generated by the master cylinder 220 is moved to the assist accumulator 70. At this time, the movement of the braking hydraulic pressure from the main motor pump 210 to the master cylinder 220 is restrained, and the movement of the braking hydraulic pressure to the first and second wheel cylinders 4 and 5 is also restrained.

When an operation error of the main braking part 1 occurs in a case in which vehicle braking is required, the high braking hydraulic pressure stored in the assist accumulator 70 is moved to the first-second hydraulic line 232 and the second-second hydraulic line 242, and then moved to the first wheel cylinders 4 and the second wheel cylinders 5. At this time, the movement of braking hydraulic pressure to the first-first hydraulic line 231 and the second-first hydraulic line 241 is restrained.

When the first-first hydraulic line 231 and the second-first hydraulic line 241 are opened with the vehicle braked by the assist braking part 2, the braking hydraulic pressure of the wheel cylinders 3 may be relieved. When the braking hydraulic pressure is to be rapidly relieved as in vehicle posture control, the braking hydraulic pressure applied to the wheel cylinders 3 may be adjusted through valve control of the first-second hydraulic line 232 and the second-second hydraulic line 242.

More detailed structures of the first and second assist hydraulic parts 61 and 62 may correspond to that of the assist hydraulic part 10 of FIG. 3, and the detailed structures of the first and second assist bypass parts 81 and 82 may correspond to that of the assist bypass part 30 of FIG. 3. It is also contemplated that the assist pump 50 of FIG. 12 may be applied to the assist accumulator 70 of FIG. 13.

In an electronic hydraulic brake device according to various exemplary embodiments, the main braking part 1 and the assist braking part 2 can be connected as a hydraulic pressure circuit to move braking hydraulic pressure, and high braking hydraulic pressure stored in the assist braking part 2 can be moved to the main braking part 1 and supplied to the wheel cylinders 3 in response to an operation error of the main braking part 1. Further, the assist pump 50 can be utilized to forcibly move braking fluid stored in the storage part 118 or 228 to the assist accumulator 20. Therefore, when an operation error of the main braking part 1 occurs, braking hydraulic pressure can be continuously supplied to the assist accumulator 20 to perform vehicle braking.

Although certain exemplary embodiments and implementations have been described herein, other embodiments and modifications will be apparent from this description. Accordingly, the inventive concepts are not limited to such embodiments, but rather to the broader scope of the accompanying claims and various obvious modifications and equivalent arrangements as would be apparent to one of ordinary skill in the art.

What is claimed is:

1. An electronic hydraulic brake device comprising:
a main braking part configured to drive a motor to provide hydraulic pressure to a plurality of wheel cylinders; and
an assist braking part connected to the main braking part, the assist braking part being configured to provide auxiliary hydraulic pressure to the plurality of wheel cylinders in response to an operation error of the main braking part,
wherein:
the main braking part comprises:
  a master cylinder configured to generate hydraulic pressure through operation of the motor which is drivable in forward and backward directions according to a pressurization state of a pedal;
  a first hydraulic part connected to the master cylinder, the first hydraulic part being configured to guide hydraulic pressure to a first some of the plurality of wheel cylinders;
  a second hydraulic part connected to the master cylinder, the second hydraulic part being configured to guide hydraulic pressure to a second some of the plurality of wheel cylinders; and
  a main motor pump connected to the first and second hydraulic parts, the main motor pump being configured to amplify hydraulic pressure; and
the assist braking part comprises:
  an assist hydraulic part connected to the first and second hydraulic parts, the assist hydraulic part being configured to guide hydraulic pressure;
  an assist accumulator connected to the assist hydraulic part and filled with the auxiliary hydraulic pressure; and
  an assist bypass part configured to bypass the assist hydraulic part to guide hydraulic pressure to the assist accumulator.

2. The electronic hydraulic brake device of claim 1, wherein the assist braking part further comprises:
  an assist sensing part configured to determine the auxiliary hydraulic pressure of the assist accumulator.

3. The electronic hydraulic brake device of claim 2, further comprising:
  a storage part connected to the pedal cylinder and configured to store hydraulic pressure,
  wherein the assist braking part further comprises an assist pump connected to the storage part, the assist pump being configured to transfer the hydraulic pressure stored in the storage part to the assist accumulator.

4. The electronic hydraulic brake device of claim 1, wherein the assist accumulator is configured to receive the hydraulic pressure generated by the master cylinder so as to accumulate the auxiliary braking hydraulic pressure.

5. The electronic hydraulic brake device of claim 1, wherein the assist hydraulic part comprises:
  an assist hydraulic line comprising a first end connected to the first and second hydraulic parts and a second end connected to the assist accumulator; and
  an assist hydraulic valve configured to open the assist hydraulic line in response to an operation error of the main braking part.

6. The electronic hydraulic brake device of claim 1, wherein the assist bypass part comprises:
  an assist bypass line comprising ends connected to the assist hydraulic line, the assist bypass line being configured to cause, at least in part, hydraulic pressure to bypass the assist hydraulic valve and to move to the assist accumulator; and
  an assist bypass valve configured to cause, at least in part, one direction of flow of the auxiliary hydraulic pressure in the assist bypass line.

* * * * *